US012039829B2

(12) United States Patent
Brown et al.

(10) Patent No.: US 12,039,829 B2
(45) **Date of Patent: *Jul. 16, 2024**

(54) RENDERING PIPELINE FOR ELECTRONIC GAMES

(71) Applicant: Aristocrat Technologies, Inc., Las Vegas, NV (US)

(72) Inventors: Jody Brown, Austin, TX (US); Joseph Bibbo, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,171

(22) Filed: May 11, 2023

(65) Prior Publication Data

US 2023/0282056 A1 Sep. 7, 2023

Related U.S. Application Data

(63) Continuation of application No. 17/125,483, filed on Dec. 17, 2020, now Pat. No. 11,688,226.
(Continued)

(51) Int. Cl.
*G07F 17/32* (2006.01)

(52) U.S. Cl.
CPC ................................ *G07F 17/3211* (2013.01)

(58) Field of Classification Search
CPC .. G07F 17/3211; G06F 9/45558; A63F 13/33; A63F 13/358; A63F 13/355; H04L 67/01
See application file for complete search history.

(56) References Cited

U.S. PATENT DOCUMENTS 7,070,501 B2 7/2006 Cormack
D624,927 S 10/2010 Allen
(Continued)

FOREIGN PATENT DOCUMENTS

AU 2013202658 A1 1/2014
AU 2013251288 A1 5/2014
(Continued)

OTHER PUBLICATIONS

Office Action dated Sep. 2, 2020 for U.S. Appl. No. 16/383,435 (pp. 1-7).

(Continued)

*Primary Examiner* — William H McCulloch, Jr.
*Assistant Examiner* — Ankit B Doshi
(74) *Attorney, Agent, or Firm* — Armstrong Teasdale LLP

(57) ABSTRACT

An electronic gaming device provides a rendering pipeline for an electronic game. The rendering pipeline includes a client component and a native component of the rendering pipeline, where the client component is configured to: initiate a rendering operations pipe between the client component and the native component; convert display commands from a source language of the electronic game into rendering operations of an intermediate rendering language; and transmit the rendering operations through the rendering operations pipe to the native component. The native component is configured to: receive the rendering operations via the rendering operations pipe; translate the rendering operations from the intermediate rendering language into rendering operations of the native component; and perform the rendering operations of the native component on the display device.

20 Claims, 7 Drawing Sheets

Related U.S. Application Data

(60) Provisional application No. 63/090,661, filed on Oct. 12, 2020, provisional application No. 62/959,407, filed on Jan. 10, 2020.

(56) References Cited

U.S. PATENT DOCUMENTS

| | | | | |
|---|---|---|---|---|
| D648,347 | S | 11/2011 | Chaudhri | |
| 8,360,851 | B2 | 1/2013 | Aoki | |
| 8,911,294 | B2 | 12/2014 | Antkowiak | |
| 9,424,720 | B2 | 8/2016 | Suda | |
| 9,928,691 | B2 | 3/2018 | Olive | |
| D824,932 | S | 8/2018 | Joensson | |
| 10,074,206 | B1 * | 9/2018 | Ingegneri | G06F 9/5077 |
| D834,596 | S | 11/2018 | Bae | |
| 2003/0216165 | A1 | 11/2003 | Singer | |
| 2004/0137982 | A1 | 7/2004 | Cuddy | |
| 2006/0189369 | A1 | 8/2006 | Taylor | |
| 2007/0060248 | A1 | 3/2007 | Rodgers | |
| 2007/0129135 | A1 | 6/2007 | Marks | |
| 2009/0054129 | A1 | 2/2009 | Yoshimura | |
| 2009/0239634 | A1 | 9/2009 | Nguyen | |
| 2010/0075737 | A1 | 3/2010 | Bluemel | |
| 2010/0210343 | A1 | 8/2010 | Englman | |
| 2010/0234092 | A1 | 9/2010 | Gomez | |
| 2010/0281107 | A1 | 11/2010 | Fallows | |
| 2011/0157196 | A1 * | 6/2011 | Nave | A63F 13/358 345/522 |
| 2012/0178517 | A1 | 7/2012 | Montenegro | |
| 2012/0258786 | A1 * | 10/2012 | Sylla | G07F 17/3211 463/20 |
| 2013/0331168 | A1 | 12/2013 | Street | |
| 2014/0080564 | A1 | 3/2014 | Acres | |
| 2014/0274292 | A1 | 9/2014 | Suda | |
| 2014/0323198 | A1 | 10/2014 | Tuck | |
| 2015/0310699 | A1 | 10/2015 | Meyer | |
| 2016/0042597 | A1 | 2/2016 | Olive | |
| 2016/0253873 | A1 | 9/2016 | Olive | |
| 2017/0032609 | A1 | 2/2017 | Inamura | |
| 2017/0111477 | A1 * | 4/2017 | Davis | H04L 67/34 |
| 2017/0148274 | A1 | 5/2017 | Olive | |
| 2017/0154498 | A1 | 6/2017 | Olive | |
| 2018/0001216 | A1 * | 1/2018 | Bruzzo | A63F 13/48 |
| 2018/0075708 | A1 | 3/2018 | San | |
| 2018/0268655 | A1 | 9/2018 | Olive | |
| 2020/0111312 | A1 | 4/2020 | Olive | |
| 2020/0312081 | A1 * | 10/2020 | Perrow | G07F 17/3216 |

FOREIGN PATENT DOCUMENTS

| | | | |
|---|---|---|---|
| AU | 2014202042 | A1 | 5/2014 |
| EP | 0984408 | | 3/2000 |

OTHER PUBLICATIONS

Australian Examination Report for Application No. 2018278882, dated Dec. 9, 2019, 2 pages.

Australian Examination Report for AU2016100230, dated May 11, 2016, 5 pages.

Australian Examination Report for AU2015210489, dated Jun. 14, 2016, 5 pages.

Australian Examination Report for AU2016202727, dated Jul. 4, 2016, 5 pages.

Australian Examination Report for AU2017101629, dated Jan. 16, 2018, 3 pages.

Australian Examination Report for AU2017204560, dated Feb. 1, 2018, 3 pages.

Australian Examination Report for Application No. 2018241080, dated Sep. 24, 2019.

U.S. Appl. No. 16/455,166, filed Jun. 27, 2019, System and Method for Providing a Feature Game.

Australian Examination Report for Application No. 2019200719, dated Apr. 8, 2020, 3 pages.

Australian Examination Report for AU2017101097, dated Dec. 7, 2017. (3 pages).

Office Action dated Jun. 4, 2020 for U.S. Appl. No. 29/622,662 (pp. 1-8).

Office Action dated Jun. 25, 2020 for U.S. Appl. No. 16/537,223 (pp. 1-11).

Notice of Allowance dated Aug. 31, 2020 for U.S. Appl. No. 29/622,662 (pp. 1-7).

Notice of Allowance dated Dec. 1, 2020 for U.S. Appl. No. 16/383,435 (pp. 1-7).

Corrected Notice of Allowabality dated Jan. 26, 2021 for U.S. Appl. No. 16/383,435 (pp. 1-2).

Office Action (Notice of Allowance and Fees Due (PTOL-85)) dated Feb. 23, 2023 for U.S. Appl. No. 17/125,483 (pp. 1-8).

* cited by examiner

RENDERING PIPELINE FOR ELECTRONIC GAMES

CROSS-REFERENCE TO RELATED APPLICATIONS

This application is a continuation of, and claims the benefit of priority to, U.S. patent application Ser. No. 17/125,483, filed 17 Dec. 17, 2020, and entitled "RENDERING PIPELINE FOR ELECTRONIC GAMES," which claims the benefit of priority to U.S. Provisional Patent Application No. 62/959,407, filed 10 January, 2020, entitled "RENDERING PIPELINE FOR GAME ASSETS," and U.S. Provisional Patent Application No. 63/090,661, filed 12 October, 2020, entitled "RENDERING PIPELINE FOR ELECTRONIC GAMES, the entire contents and disclosures of which are hereby incorporated herein by reference in their entireties.

TECHNICAL FIELD

The field of disclosure relates generally to electronic gaming, and more particularly to electronic gaming systems and methods for providing a rendering pipeline for electronic games.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

SUMMARY

In one aspect, an electronic gaming device providing a rendering pipeline for an electronic game is provided. The electronic gaming device includes a memory device storing the electronic game, a client component of the rendering pipeline, and a native component of the rendering pipeline. The electronic gaming device also includes a display device upon which video output of the electronic game is rendered. The electronic gaming device further includes at least one processor configured to execute the client component and the native component. The client component, when executed on the at least one processor, is configured to: initiate a rendering operations pipe between the client component and the native component; convert display commands from a source language of the electronic game into rendering operations of an intermediate rendering language; and transmit the rendering operations through the rendering operations pipe to the native component. The native component, when executed on the at least one processor, is configured to: receive the rendering operations via the rendering operations pipe; translate the rendering operations from the intermediate rendering language into rendering operations of the native component; and perform the rendering operations of the native component on the display device.

In another aspect, a method for providing a rendering pipeline for an electronic game on an electronic gaming device is provided. The electronic gaming device includes a memory device storing the electronic game, a client component of the rendering pipeline, and a native component of the rendering pipeline. The electronic gaming device also including a display device upon which video output of the electronic game is rendered. The electronic gaming device further includes at least one processor configured to execute the client component and the native component. The method includes establishing a rendering operations pipe between the client component and the native component. The method also includes converting, at the client component, display commands from a source language of the electronic game into rendering operations of an intermediate rendering language. The method further includes transmitting the rendering operations through the rendering operations pipe from the client component to the native component. The method also includes receiving, at the native component, the rendering operations via the rendering operations pipe. The method further includes translating the rendering operations from the intermediate rendering language into rendering operations of the native component. The method also includes performing the rendering operations of the native component on the display device.

In yet another aspect, a non-transitory computer-readable medium storing instructions is provided. The instructions, when executed by a processor of an electronic gaming device, cause a processor to: establish a rendering operations pipe between a client component and a native component; convert, at the client component, display commands from a source language of the electronic game into rendering operations of an intermediate rendering language; transmit the rendering operations through the rendering operations pipe from the client component to the native component; receive, at the native component, the rendering operations via the rendering operations pipe; translate the rendering operations from the intermediate rendering language into rendering operations of the native component; and perform the rendering operations of the native component on the display device.

BRIEF DESCRIPTION OF THE DRAWINGS

An example embodiment of the subject matter disclosed will now be described with reference to the accompanying drawings.

DETAILED DESCRIPTION

Figure 1:
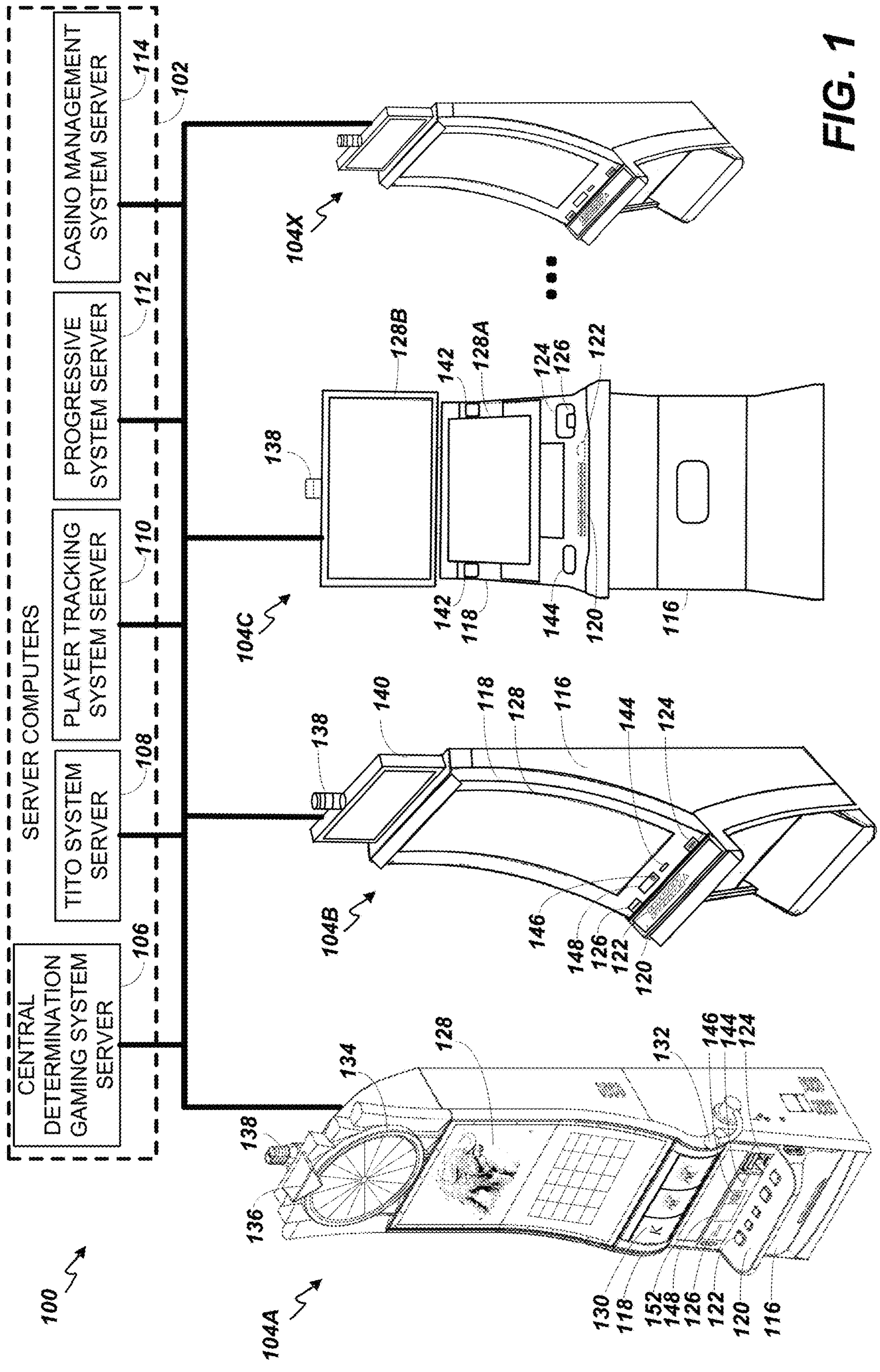
FIG. 1 is a diagram of exemplary EGMs networked with various gaming-related servers.

Slot type games and other wager-type games (e.g., video poker, video keno, video roulette, and such) may be provided as either wagering games (e.g., for real value, or "value-based gaming") or as "social games" (e.g., using virtual currencies, no value virtual goods or currencies with no inherent value). Traditionally, wager games have been provided on highly regulated electronic gaming machines specifically designed for wager gaming venues (e.g., casino properties or other gambling establishments). As such wager gaming and social gaming has evolved, and the hardware platforms on which these games may be offered has expanded. For example, social games may be provided on personal computing devices, such as desktop computers or mobile computing devices (e.g., smart phones, tablets). In some jurisdictions, wager games may be permitted on mobile computing devices (e.g., when the mobile computing device is located within a sanctioned premises). These various hardware platforms may also provide varying operating system and software components that can be leveraged in game development. However, the expansion of available hardware platforms, operating systems, and associated software components upon which such electronic games may be provided also brings various design problems, such as software portability and performance issues across varying platforms and software stacks.

For example, a gaming company may wish to provide mobile games using current web technologies, such as programming their games in a just-in-time ("JIT") compiled language (e.g., JavaScript, Typescript), with the game's front end being designed to run in a web browser. To support such an architecture, WebGL and WebAudio components of the browser may be used to perform rendering functionality. However, such an architecture may be tightly coupled to the underlying rendering backend. Some environments may restrict use of particular tools, such as just-in-time compilers, forcing games to be implemented by an interpreter, which may cause performance to suffer.

In the example embodiment, a rendering pipeline architecture (or just "rendering pipeline") is provided for the execution of electronic games and, more particularly, for the rendering of game assets (e.g., video, audio, and the like). The rendering pipeline includes a client component ("front end") and a native component ("back end") installed on a gaming device, such as an EGM or a personal computing device (e.g., personal computer, mobile computing device). The client component executes the electronic game in a virtual machine (e.g., Java virtual machine ("JVM"), JavaScript engine, ECMAScript ("ES") engine) using a scripting language (e.g., JavaScript, Typescript) and, in the example embodiment, provides just-in-time ("JIT") compilation of some or all of the electronic game (e.g., as part of loading source into the JVM or a WebView). During execution of the electronic game, the client component uses a WebView object to parse and execute the electronic game, but redirects the display rendering through the rendering pipeline by generating and transmitting rendering operations, through one or more pipes, to the native component (e.g., a scene renderer of the Unity engine). The native component receives and processes these rendering operations from the pipe in order of receipt (e.g., as a first-in/first-out ("FIFO") pipe). In some embodiments, the native component may include a rendering tool such as the Unity Engine, and the native component is configured to convert the render commands from the pipe into the native rendering language on the local gaming device (e.g., into rendering commands via an API, such as OpenGL, Metal, Direct3D, or the like). The native component is responsible for communicating with the underlying operating system and associated hardware and subsystems of the executing device. The use of this rendering pipeline allows for separation of the electronic game from the particularities of the various underlying operating systems and hardware components of various gaming devices, allowing the game code to be developed and executed independent of such considerations. The native component is tailored to receive the rendering operations and perform those various operations on the specific hardware of the gaming device. This decoupling of the native rendering from the electronic game provides technical benefits including platform compatibility and independence from underlying rendering technologies which may change over time (e.g., OpenGL, Metal, or the like). Further, use of such an intermediate rendering language and separation of the game execution and the native rendering component allows for efficient, accurate, and effective game recording, compression, and replay of game sessions by, for example, recording the stream of rendering operations sent across the pipe. From such a recording, the game session can be recreated for viewing by replaying and reprocessing the stream of rendering operations (e.g., by sending the same rendering operations through the pipe to be processed as if the game were being executed by the client).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a “ticket-in” reader that allows the player to use a casino issued credit ticket to load credits onto the gaming device 104A (e.g., in a cashless ticket (“TITO”) system). In such cashless embodiments, the gaming device 104A may also include a “ticket-out” printer 126 for outputting a credit ticket when a “cash out” button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player’s smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
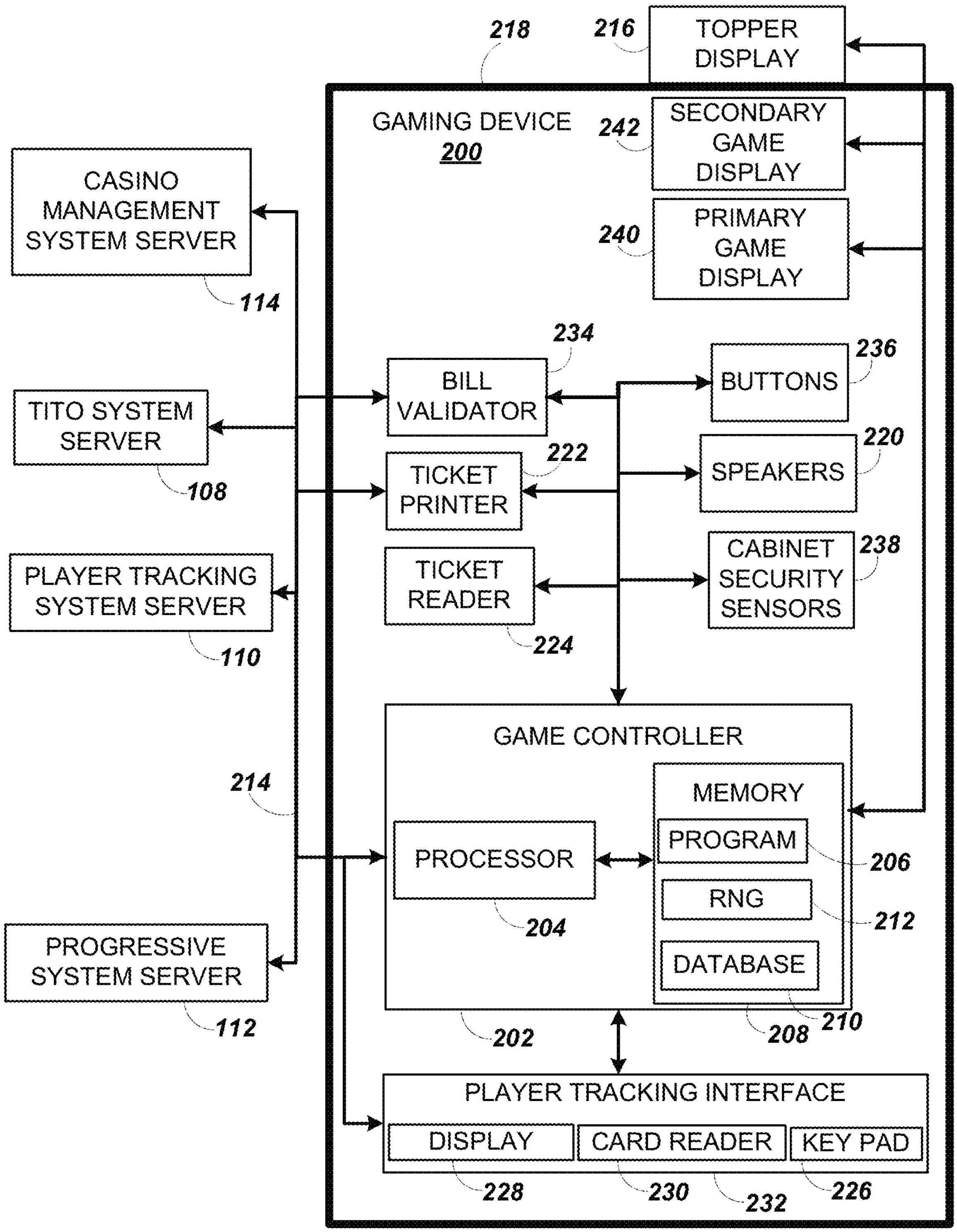
FIG. 2A is a block diagram of an exemplary EGM.

Many or all the above described components can be controlled by circuitry (e.g., a gaming controller) housed inside the main cabinet 116 of the gaming device 104A, the details of which are shown in FIG. 2A.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2A but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 2B:
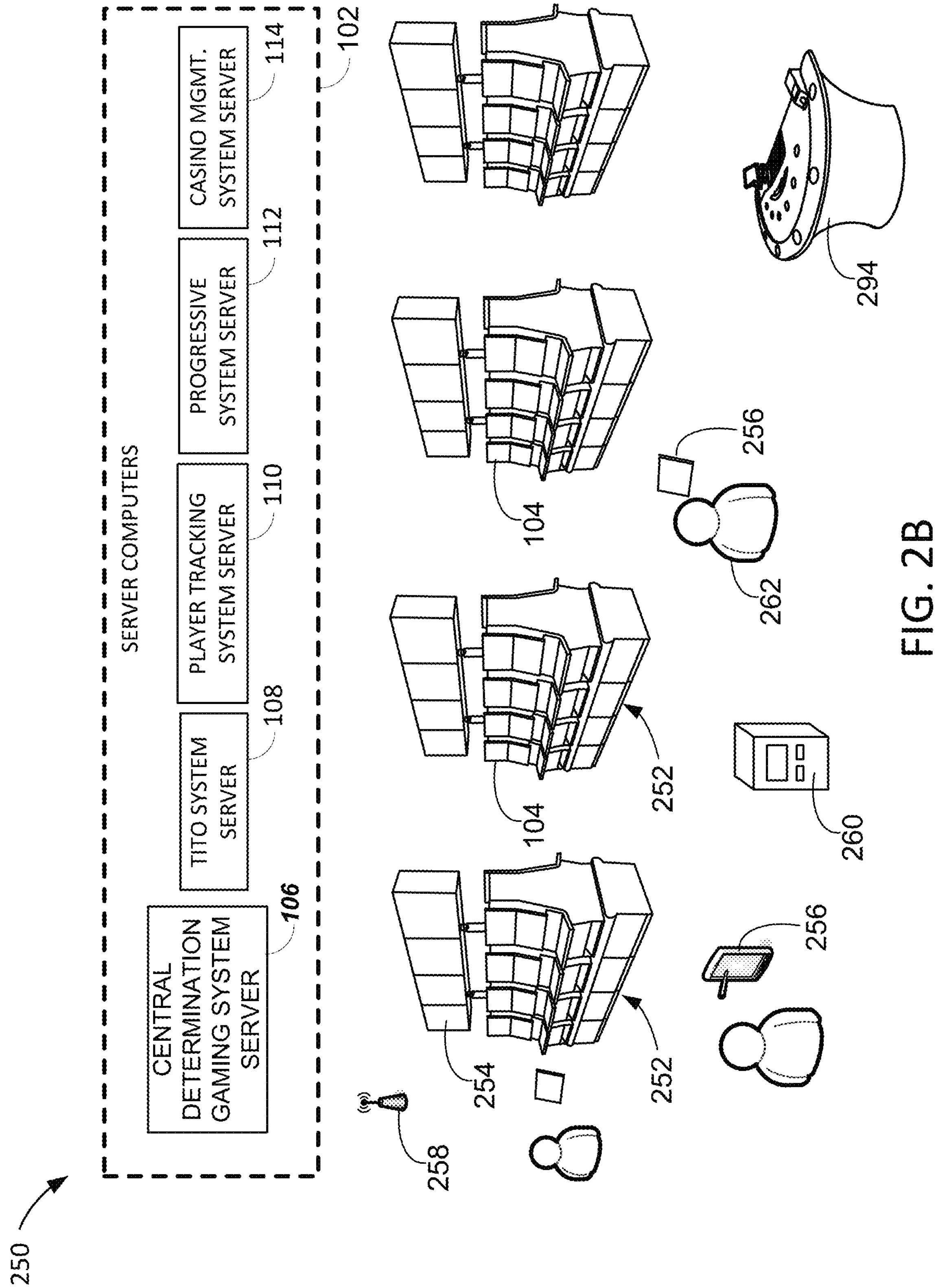
FIG. 2B illustrates an example gaming environment in which the gaming devices shown in FIGS. 1 and 2A may appear.

FIG. 2B illustrates an example gaming environment 250 in which the gaming devices 104, 200 shown in FIGS. 1 and 2A may appear. In the example embodiment, the gaming environment 250 is a physical venue of a casino that includes banks 252 of gaming devices 104. In this example, each bank 252 of gaming devices 104 includes a corresponding gaming signage system 254. In this example, the gaming environment 250 includes a gaming table (e.g., a "smart table") 294 that is configured for table gaming. The gaming environment 250 also includes mobile gaming devices 256 which, in various embodiments, may present wagering games or social games. The mobile gaming devices 256 may, for example, include tablet devices, cellular phones, smart phones, or other handheld computing devices. In this example, the mobile gaming devices 256 are configured for communication with one or more other devices in the gaming environment 250, including but not limited to one or more of the gaming devices 104, one or more smart tables 294, one or more kiosk(s) 260, and one or more of the server computers 102, via wireless access points 258. In some implementations, the mobile gaming devices 256 may be configured for communication with one or more other devices in the gaming environment 250, including but not limited to one or more of the gaming devices 104, one or more smart tables 294, one or more kiosk(s) 260, via wireless communications (e.g., near-field communication (NFC), Bluetooth, Wi-Fi, or such, via one of the "beacons" described herein).

According to some examples, the mobile gaming devices 256 may be configured for stand-alone determination of game outcomes. However, in some alternative implementations the mobile gaming devices 256 may be configured to receive game outcomes from another device, such as a central determination gaming system server (not separately shown), one of the gaming devices 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some embodiments, the gaming environment 250 may include one or more kiosks 260 that are configured to facilitate monetary transactions involving the mobile gaming devices 256, which may include cash out and/or cash in transactions. The kiosk(s) 260 may be configured for wired and/or wireless communication with the mobile gaming devices 256. The kiosk(s) 260 may be configured to accept monetary credits from casino patrons 262 or to dispense monetary credits to casino patrons 262 via cash, a credit or debit card, via a wireless interface (e.g., via a wireless payment app), via tickets, digital wallet, or such. According to some examples, the kiosk(s) 260 may be configured to accept monetary credits from a casino patron and to provide a corresponding amount of monetary credits to a mobile gaming device 256 for wagering purposes (e.g., via a wireless link such as an NFC link). In some such examples, when a casino patron 262 is ready to cash out, the casino patron 262 may select a cash out option provided by the mobile gaming device 256, which may include a real button or a virtual button (e.g., a button provided via a graphical user interface) in some instances. In some such examples, the mobile gaming device 256 may send a "cash out" signal to the kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, a digital wallet account, or such.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as within a casino gaming area (e.g., based on GPS and geofencing).

Figure 2C:
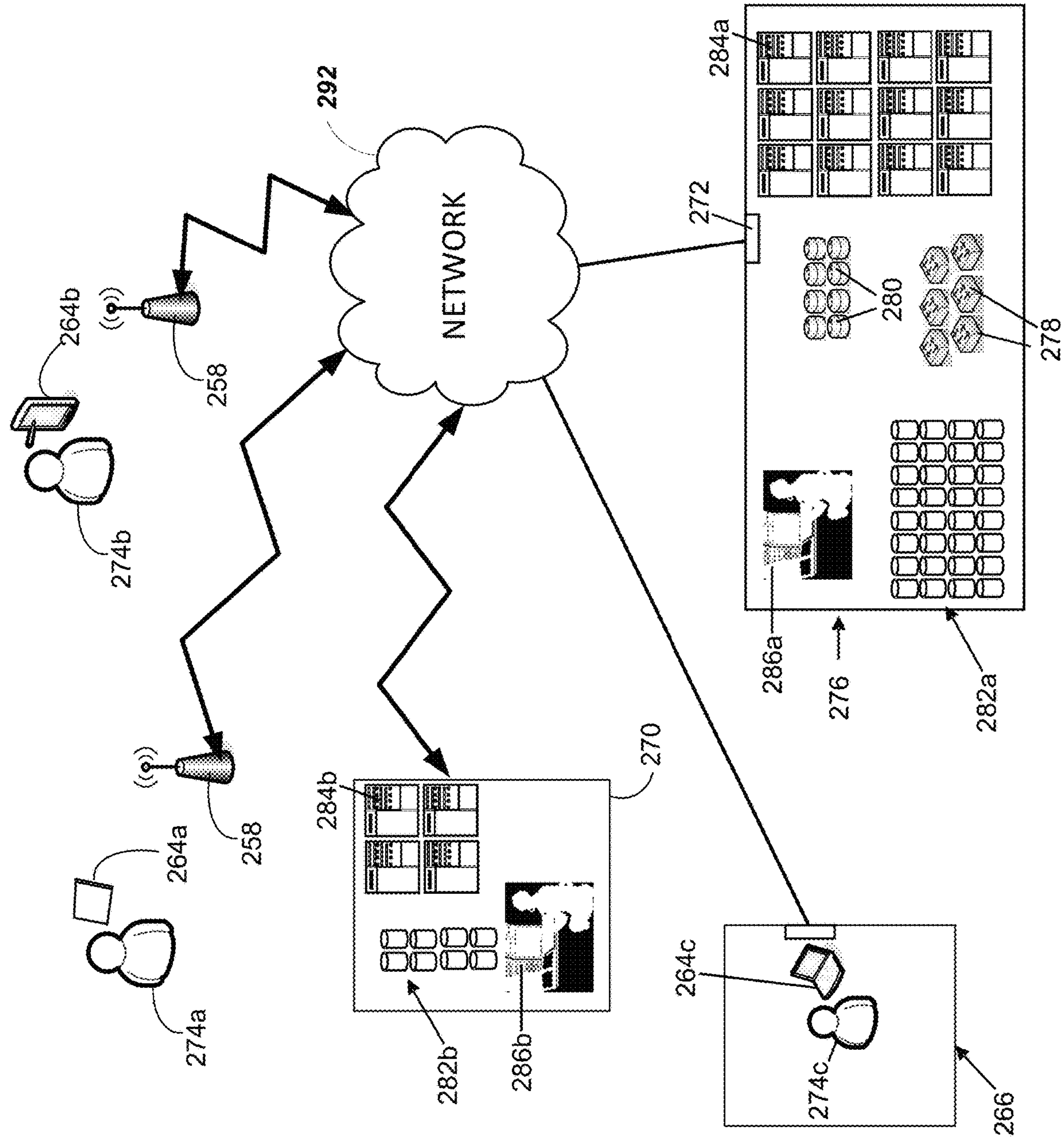
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In the example embodiment, various gaming devices, including but not limited to end user devices (EUDs) 264*a*, 264*b* and 264*c* are capable of communication via one or more networks 292. The networks 292 may, for example, include one or more cellular telephone networks, the Internet, Wi-Fi networks, satellite networks, or such. In this example, the EUDs 264*a* and 264*b* are mobile devices. For example, the EUD 264*a* may be a tablet device and the EUD 264*b* may be a smart phone. The EUD 264*c* is a laptop computer that is located within a residence 266 at the time depicted in FIG. 2C. Accordingly, in this example the hardware of EUDs 264 is not specifically configured for online gaming, although each EUD 264 is configured with software for online gaming. For example, each EUD 264 may be configured with a web browser, installed gaming applications, player apps, or such. Other implementations may include other types of EUD 264, some of which may be specifically configured for online gaming.

In this example, a gaming data center 276 includes various devices that are configured to provide online wagering games or social games via the networks 292. The gaming data center 276 is capable of communication with the networks 292 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play or for download and installation by remote devices (e.g., EUDs 264). In some examples, code for executing at least some of the games may initially be stored on one or more of the storage devices 282*a*. The code may be subsequently loaded onto a server 284*a* after selection by a player via an EUD 264 and communication of that selection from the EUD 264 via the networks 292. The server 284*a* onto which code for the selected game has been loaded may provide the game according to selections made by a player and indicated via the player's EUD 264. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 292. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, payment card accounts, rewards accounts, loyalty accounts, player accounts, digital wallet accounts, or such. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost, or various social games, some of which may use virtual currencies. According to some such implementations, one or more of the servers 284*a* may be configured to monitor player credit balances, which may be expressed in game credits, in real or virtual currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some embodiments, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

In some embodiments, the financial institution data center 270 may be configured for communication with one or more devices in the gaming environment 250. As noted above, the mobile gaming devices 256 may or may not be specialized gaming devices, depending on the particular implementation. In some examples, the mobile gaming devices 256 may be end user devices (EUDs 264), such as tablet devices, cellular phones, smart phones and/or other handheld devices.

In some embodiments, the gaming environment 250 may include one or more kiosks 260. According to some implementations, the kiosk(s) 260 may be part of the digital wallet management server 290 even though in FIG. 2B the kiosk(s) 260 and the digital wallet management server 290 are shown separately. The kiosk(s) 260 may be configured for communication with other devices of the digital wallet management server 290 (e.g., with one or more servers of the digital wallet management server 290), for example, to allow digital wallet-based transactions at the kiosk 260 (e.g., purchasing credits from a digital wallet account to cash or to a TITO ticket, redeeming a TITO ticket to a digital wallet account, redeeming a reward stored in a digital wallet).

In some embodiments, the kiosk(s) 260 may be configured to facilitate monetary transactions involving a digital wallet (e.g., monetary transactions involving digital wallet software being executed by one or more of the mobile gaming devices 256). Such transactions may include, but are not limited to, cash out and/or cash in transactions. The kiosk(s) 260 may be configured for wired and/or wireless communication with the mobile gaming devices 256. The kiosk(s) 260 may be configured to accept monetary credits from casino patrons 262 and/or to dispense monetary credits to casino patrons 262 via cash, a credit or debit card, via a wireless interface (e.g., via a wireless payment app), via tickets, etc. Accordingly, in some such examples, the kiosk(s) 260 may be configured for communication with one or more financial institution data centers.

In some embodiments, the kiosk(s) 260 may be configured to accept monetary credits from a casino patron and to provide a corresponding amount of monetary credits to a mobile gaming device 256 for wagering purposes (e.g., via a wireless link such as a near-field communications link). According to some implementations, a digital wallet app running on one of the mobile gaming devices 256 (e.g., on a patron's cell phone) may be configured for wireless communication with gaming devices 104, smart tables 294, or such (e.g., to provide digital wallet-based, cashless "cash-out" and/or "cash-in" transactions at location). In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some examples, at least some of the mobile gaming devices 256 may be configured for implementing digital wallet transactions with a gaming device 104 or a smart table 294 via Bluetooth or NFC. According to some implementations, the gaming device 104 or smart table 294 may be configured to provide a Bluetooth low-energy (LE) beacon for establishing wireless communication with at least some of the mobile gaming devices 256. In some implementations, the mobile gaming device 256 may implement digital wallet transactions (such as cash in or cash out transactions) with the gaming device 104 or smart table 294 directly, via NFC or Bluetooth. In other implementations, the gaming device 104 or smart table 294 may be able to transmit communications to a mobile gaming device via NFC or the Bluetooth (LE) beacon, but the mobile gaming device may be required to provide input to the gaming device 104 or smart table 294 indirectly (e.g., via one or more devices of a player loyalty system or of a digital wallet management system).

Some embodiments provide alternative methods of establishing a "cardless" connection between a mobile gaming device and an EGM 104 or a smart table 294. In some such implementations, a player tracking interface of the gaming device 104 or smart table 294 may be configured to establish a wireless connection and a cardless player tracking session with a mobile gaming device. For example, the gaming device 104 may be configured to establish a wireless connection and a cardless player tracking session with a mobile gaming device via the player tracking interface 232 that is described above with reference to FIG. 2A. A smart table 294 may be configured to establish a wireless connection and a cardless player tracking session with a mobile gaming device.

In some examples, a player tracking interface of the gaming device 104 or smart table 294 may be configured for wireless communication with a mobile gaming device (e.g., via Bluetooth or NFC). In some such examples, the player tracking interface may include a user interface (e.g., a GUI or a physical button) with which a player can interact in order to obtain a passcode from the player tracking interface. The passcode may, for example, be an RNG code. The passcode may be provided to the player via a display of the player tracking interface. The player may be required to input the code (e.g., via the mobile gaming device) in order to pair the mobile gaming device with the player tracking interface and enable digital wallet transactions with the EGM or the smart table. According to some such implementations, a "cardless" player loyalty session may also be established when the mobile gaming device is paired with the player tracking interface.

Figure 3A:
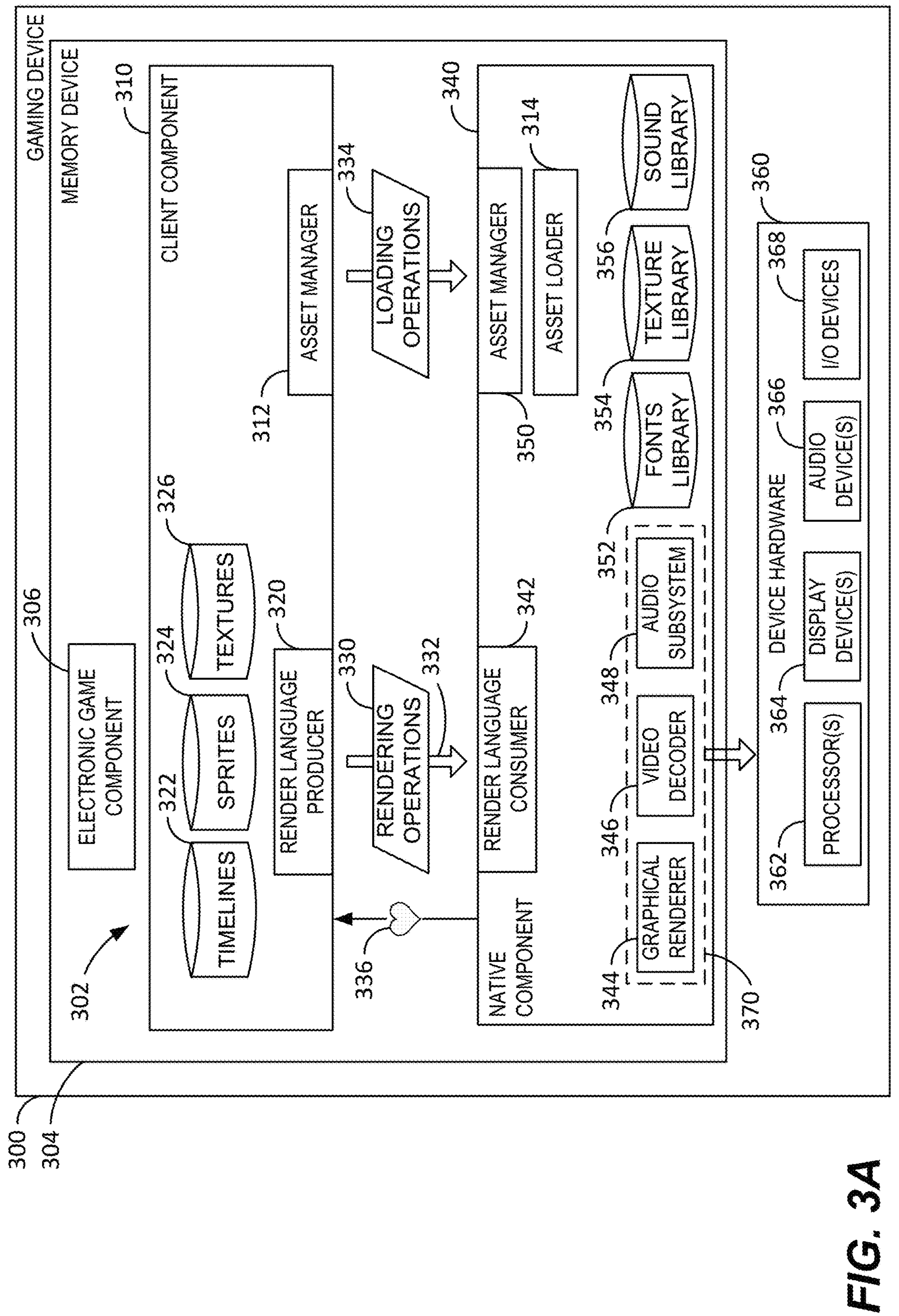
FIG. 3A illustrates hardware components of a gaming device and data flow between components of a rendering pipeline executing on the device.

FIG. 3A illustrates hardware components of a gaming device 300 and data flow between components of a rendering pipeline 302 executing on the device 300. In some embodiments, the gaming device 300 is an electronic gaming machine, such as gaming devices 104, 200. In the example embodiment, the gaming device 300 is a personal computing device of a player, such as a mobile computing device (e.g., smart phone, tablet) or a personal computer. In some embodiments, the gaming device 300 may be similar to the mobile gaming devices 256 shown in FIG. 2B or the end user devices 264 shown in FIG. 2C. The gaming device 300 includes a memory device 304 (e.g., RAM memory, solid state drive, or other such transitory and/or non-transitory storage media) that stores various components used to execute an electronic game, represented here as electronic game component 306, as well as components of the rendering pipeline 302 (e.g., a client component 310 and a native component 340). The gaming device 300 also includes other device hardware 360 specific to the particular device 300, and may vary considerably in various hardware components, configurations, and settings. In this example, the device hardware 360 includes one or more processors 362 (e.g., processor 203, central processing unit ("CPU") of a personal computing device, or such), one or more display devices 364 (e.g., game displays 240, 242, touch screen display of a mobile device, desktop display device of a personal desktop computer, or the like), one or more audio devices 366 (e.g., speakers 220), and one or more input/output ("I/O") devices 368 (e.g., buttons 236, touch screen surface of a mobile device, keyboard and mouse of a personal desktop computer, or the like). While components of the rendering pipeline 302 are illustrated here as a part of the memory device 304, it should be understood that these components are executed by a processor, such as processors 362, game controller 202, or such, and FIG. 3A illustrates aspects of data flow of the rendering pipeline 302 for purposes of describing various embodiments. Further, it should be understood that the gaming device 300 may include an operating system (not separately depicted for ease of illustration, e.g., Windows, Android, iOS, or the like) and the native component 340 may perform various interactions with the device hardware 360 via interactions with the operating system and various underlying device drivers (also not separately depicted). In addition, the client component 310 of the example embodiment includes a virtual machine (e.g., JVM, not separately depicted) that is configured to perform JIT compilation and execution of the electronic game component 306. In some embodiments, the client component 310 is executed within a virtual machine instantiated by the native component.

The client component 310 receives the electronic game component 306 for execution on the gaming device 300. In the example embodiment, the electronic game component 306 is an electronic game developed in JavaScript or Typescript ("game source code"), and the client component 310 includes a Java virtual machine ("JVM") (not separately depicted) that can execute the game source code. The client component 310 may create a WebView object (e.g., an embedded web browser, not separately depicted, installed and executing on the gaming device 300) that is configured to execute game source code in the WebView (e.g., via offscreen WebKit rendering). The client component 310 receives the electronic game component 306 in game source code (e.g., JavaScript source) and executes the game component 306 through the JVM. For example, when some external event occurs, such as user selection of a game from a lobby of possible games, the game source code may be received and inserted as a <script> tag/object into a Document Object Model ("DOM") of an IFRAME. The WebView object then renders the DOM, which in turn executes the game component 306. More specifically, the client component 310 performs just-in-time compilation on any uncompiled code needed to execute the game component 306 and executes the compiled game. The game script installs a handler in the globals space on a 'requestAnimationFrame' ("RAF") event. This event is scheduled to periodically fire at the WebView's discretion (e.g., 15 to 60 frames per second, based on a shared heartbeat 336 provided by the native component 340). This RAF event drives the game and provides smooth animations.

The electronic game component 306 provides and utilizes various game assets during game play, including timelines 322, sprites 324, and textures 326 that are used to provide aspects of game play. In some embodiments, the electronic game is a slot style game provided in a wagering environment (e.g., involving wagering for value) or a social environment (e.g., using virtual currencies of no intrinsic value). During game initiation and execution, an asset loader 314 constructs various game objects such as timelines 322, sprites 324, and textures 326. The client component 310 then uses these nodes to construct the layout and the behavior of the game 306. Some such game objects may require game assets that need to be rendered during game execution (e.g., digital video assets, audio assets, or the like). The native component 340 is ultimately responsible for rendering the assets to the screen. As such, the client component 310 orchestrates when a new asset is loaded and commands the native component 340 to load up the raw materials of the assets. More specifically, an asset manager 312 of the client component 310 generates and transmits loading operations 334 (e.g., commands) to an asset manager 350 of the native component 340 as new assets are needed by the executing game. The native component 340 provides the asset loader 314. As part of game execution, the client component 310 transmits loading operations 334 to the asset loader 314 instructing the native component 340 which assets to load into memory as part of game execution (e.g., from non-transient storage into transient storage, RAM memory of the executing process). Game assets can be grouped into nodes and materials. Nodes represent elements that the game uses to control how the game will look (e.g., drawing a sprite node of an 'Ace' symbol at position X, size Z, color C, and opacity 0). The actual image for the 'Ace' is in a material called a texture. Nodes may include timelines 322, text, sprites 324, sounds, or the like. Materials may include audio clips, fonts, textures, video textures, image sequences, or the like. During operation, the client component 310 loads nodes for a given asset, and the native component 340 loads materials for the given asset (e.g., via the asset manager 350 and asset loader 314).

During game play, in the example embodiment, the client component 310 executes the electronic game on the gaming device 300 as the front end component of the pipeline 302. In some embodiments, the gaming device 300 provides a virtual 'lobby' (not shown) through which the player may select a particular game for execution. When a particular game is selected through the lobby, the native component 340 downloads the selected game and initiates setup and execution of the game (e.g., game component 306). In some embodiments, the native component 340 downloads the electronic game and all associated components (e.g., game source code, game assets, or the like) from a remote games library such as the games database 374 shown in FIG. 3B. The native component 340 stores some game assets (e.g., materials) in a fonts library 352, texture library 354, and sound library 356 for potential use during game execution.

The electronic game assets also include game source code (e.g., JavaScript). The native component 340, in the example embodiment, inserts handlers into the game source code that, upon execution in the client component 310, will cause the client component 310 to establish the rendering pipe 332 and transmit rendering operations 330 to the native component 340. After modification of the game source code, the native component 340 creates a virtual machine and causes the game source code to execute within that virtual machine (e.g., in an offscreen WebKit). This virtual machine that executes the game source code becomes the client component 310 of the rendering pipeline 302 shown in FIG. 3A. During execution of the game source code, the native component 340 establishes a heartbeat 336 that is configured at a particular frequency (e.g., 15-60 frames per second). This heartbeat 336 is used to dictate, to the client component 310, how frequently to generate and send rendering operations 330 to the native component 340. The client component 310 establishes connections to the native component 340 (e.g., pipe 332 for rendering operations 330, and perhaps another connection for loading operations 334) and begins executing the game. After these connections are established, game execution includes attaching the game to RAF event, which will give the game a periodic heartbeat consistent with the heartbeat 336. The game performs initialization logic which loads up the assets needed for the initial scene. Some operations of the electronic game component 306 utilize audio and visual display functionality for purposes of presenting aspects of the game to the player (referred to herein as "source operations" or "source output operations"). To facilitate game execution, the render pipeline 302 provides a render language ("RL") that is used by the client component 310 to send rendering operations 330 to the native component 340 for processing. These rendering operation 330 may be referred to herein as "intermediate rendering operations", in distinction to native rendering operations which may be sent to a graphical renderer 344, video decoder 346, or audio subsystem 348 for presentation by device hardware 360. To facilitate such intermediate rendering operations, the client component 310 provides a render language producer 320 that is configured to generate streams of rendering operations 330 based on the configuration and instructions of the electronic game component 306 and associated assets (e.g., based on the source output operations of the electronic game component 306). RL producer 320 creates these rendering operations 330 in a text-based intermediate rendering language described in further detail below. These rendering operations are subsequently received by the native component 340. Upon receipt of a particular set of rendering operations 330, the rendering operations 330 are performed by a render language consumer 342 on the native component 340 (e.g., processed as FIFO operations as received). In the example embodiment, the render language consumer 342 translates each of the rendering operations 330 from the intermediate rendering language into native rendering operations of a native backend renderer 370 (e.g., OpenGL, Metal, Direct3D) of the gaming device 300. Such native rendering operations may include API calls in native rendering operations for that particular backend renderer 370. As the render language consumer 342 submits these native rendering operations 330 to the backend renderer 370, the backend renderer 370 interacts with the device hardware 360 to perform the rendering operations 330 on the native device hardware 360 (e.g., through various sub-components of the gaming device 300, such as a graphical renderer 344, a video decoder 346, an audio subsystem 348, and the like). As such, the rendering operations 330 generated by the client component 310 are translated into native operations that can be presented on the local hardware, thereby exhibiting the various technical advantages described herein, including a rendering language that is API-agnostic to the particular backend renderers 370 provided on various disparate types of gaming devices 300.

For example, in some embodiments, the electronic game component 306 may include JavaScript code that provides timeline operations during execution of the game (e.g., that certain timelines are played, stopped, paused, and so forth). The client component 310 converts such timeline operations into an internal node representation (e.g., Text2D, Sprite2D, and so forth). These nodes contain internal state information used to present game objects (e.g., transforms representing position, rotation, scale, vectors representing color, and so forth). The client component 310 may build a scene graph for the game. In the example embodiment, the client component 310 serializes this scene graph via corresponding intermediate rendering operations (e.g., Sprite2D, Text2D) and send this stream to the render language consumer 342 (e.g., as rendering operations 330 in pipe 332). The render language consumer 342 deserializes the stream of rendering operations 330, building its own internal representation of the node objects and creating a corresponding scene graph on the native side (e.g., in the native component 340). For example, Sprite2D commands may get converted into a series of mesh, vertex, triangle lists, and UVs. These native rendering operations (e.g., in a format that Unity3D understands) may be sent to the graphics and audio devices 364, 366 (e.g., after any final Unity3D to low-level API conversions). Further, the consumer 342 may also keep track of all objects on a frame-by-frame basis utilizing a unique element ID. This may be used to modify already existing objects that may have moved from one frame to the next and also perform garbage collection or object recycling if a particular object is absent from one frame to the next. This allows the native component 340 to run with minimized memory consumption and greater memory efficiency.

In some embodiments, the graphical renderer 344, video decoder 346, and audio subsystem 348 are provided by a third-party rendering engine, such as the Unity Engine, which abstracts away from the native component 340 certain hardware-specific details of the local device hardware 360 (e.g., interaction with particular display devices 364, audio devices 366, and I/O devices 368), and the native component 340 is implemented as an extension (e.g., plug-in) of the third-party rendering engine 370. The binary formatted data is optimized for performance by minimizing the size. The RL consumer 342 translates the binary data from pipe 332 and translates the operations into C # instructions. In some embodiments, rendering operations 330 are generated for graphics operations and transmitted through to the native component 340 for processing and display, but audio operations are processed directly by the client component 310 (e.g., working directly with the underlying operating system of the gaming device 300 and associated device drivers, media players, or the like). Such bifurcation between audio and video processing may be beneficial in certain hardware or software architectures, such as with mobile platforms.

In some embodiments, the client component 310 establishes two paths of asynchronous communication from the client component 310 to the native component 340, the rendering pipe 332 (e.g., for rendering operations 330) and a path for loading operations 334. The loading operations 334 are used to initiate loading and staging of game assets on the native component 340 in anticipation of upcoming use. In the example embodiment, the native component 340 has the various game assets for the loaded game stored in the fonts library 352, texture library 354, and sound library 356. Such loading operations 334 may include various assets that are used during rendering such as, for example, a texture load operation representing a static texture or texture atlas, a font load operation including font material used for text rendering, a video texture load operation, an image sequence load operation, an audio clip load operation, and a mask material load operation. In some embodiments, the asset manager 312 loads game assets as they are needed during game play, where in other embodiments, the asset manager 312 may load all game assets at the beginning of execution (e.g., at game initialization). When an asset is needed, the asset manager 312 generates loading operations 334 for transmission to the native component 340, thereby resulting in assets being loaded by the asset manager 350 of the native component 340 in anticipation of upcoming use (e.g., assets referenced in upcoming rendering operations 330). For example, any rendering operation 330 that requires loading new assets may cause loading operations 334 to be performed prior to any rendering operations 330 that reference those new assets. The rendering pipe 332, in the example embodiment, is a FIFO pipe that provides rendering operations 330 to be performed by the native component 340 (e.g., based on the order received). Rendering operations 330 may include, for example, a 2-dimensional ("2D") sprite render operation representing a static symbol, image sequence, or video texture, a 2D text render operation representing a 2D text string from a bitmapped texture, an update mask operation to animate a mask material, a push mask operation to apply a bank of masks to the renderable items to follow, a pop mask operation to remove a bank of masks from the renderable items to follow, and a set camera operation to set camera perspective for renderable items to follow. When processing the rendering operations 330 from the rendering pipe 332, the consumer 342 assumes a painter model, rendering objects in the order they are retrieved from the pipe 332. In other embodiments, 3-dimensional rendering operations may be supported. Additional example intermediate rendering language operations and syntax are described in further detail below.

In one example embodiment, each frame is driven by RequestAnimationFrame (RAF) events of the WebView controlled by the JVM. For example, the WebView may include a refresh rate (e.g., in frames per second), and the RL producer 320 may generate and transmit rendering operations 330 through the rendering pipe 332 for each frame at a time, n. Rendering operations 330 may include, for example, an operation type (e.g., the sequenced operation to be executed on the native side), a node identifier (e.g., the unique identifier that ties the operation to a particular asset), and model data (e.g., game-controlled data that provides node position, size, scale, opacity, rotation, and such). Example operations may include, for example, Sprite2D, TextString2D, FrameUpdate, MaskPCommand, CameraPCommand.

Such rendering operations 330 and loading operations 334 provide hardware agnostic instructions that are generated from various source languages of the electronic game components 306 (e.g., JavaScript, Typescript, C++, C #, or the like). These hardware agnostic instructions are then processed by the native component 340, which is configured execute such instructions on the particular local device hardware 360. Since the client component 310 does not interact directly with the device hardware 360 or subsystems, the electronic game component 306 and client component 310 may be independent of various specific hardware and operating system differences between various platforms. Instead, the native component 340 is customized and configured to interact with the particular device hardware 360 and subsystems specific to the gaming device 300. As such, the rendering pipeline 302 and rendering operations 330 between the producer 320 and consumer 342 allows the client component 310 and the electronic game component 306 to be hardware agnostic. Further, the client component 310 may be configured with a just-in-time compiler that facilitates JIT compilation of some or all of the electronic game component 306 independent of native limitations of the native operating system (e.g., iOS). By using web technologies to implement the game, the system described herein provides for downloadable games that do not require redeployment of the application. Rather, games and assets can be developed and deployed independently from the lobby application. By handling rendering operations directly on the native game platform (e.g., Unity), performance is significantly improved over a pure web-based rendering solution.

Figure 3B:
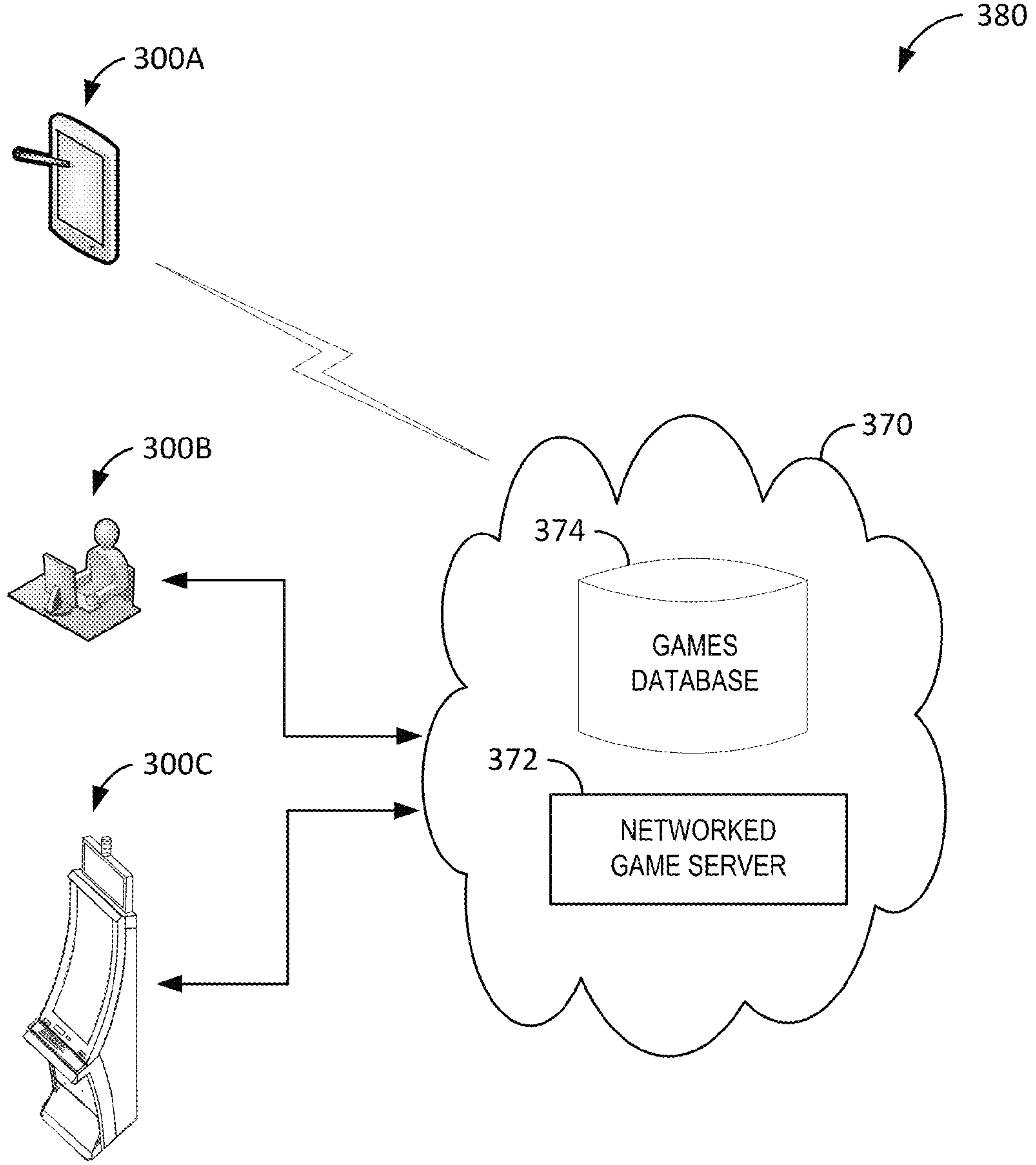
FIG. 3B illustrates an example networked architecture in which the gaming devices may operate.

FIG. 3B illustrates an example networked architecture 380 in which the gaming devices 300 may operate. In some embodiments, the gaming devices 300 may store one or more electronic games locally (e.g., assets and execution code in a local repository on internal storage). In the example embodiment shown here, the gaming devices 300 access a remote games database 374 for aspects of the electronic game (e.g., for game assets, game execution code, and the like). The games database 374 is hosted by a networked game server 372 provided on a network 370, such as a local area network ("LAN"), wide area network ("WAN"), the Internet, or the like. In some embodiments, the games database 374 operates as a games library from which the gaming devices 300 can load games.

In some embodiments, gaming devices 300 can include mobile devices 300A, such as smart phones or tablet computing devices of players. In some embodiments, gaming devices 300 can include personal computing devices 300B, such as home personal computers or laptop computers of players. In some embodiments, gaming devices 300 can include EGMs 300 such as the gaming devices 104 shown in FIG. 1 and the gaming device 200 shown in FIG. 2A. During operation, the gaming devices 300 download game components from the games database 374 for execution on the local gaming device 300A, 300B, 300C as described above. In some embodiments, the gaming devices 300 may provide a graphical user interface ("GUI") that allows the player to select from a library of games provided by the games database 374 and, upon selection of a particular game for play, the gaming device 300 initiates a download of that game and associated components (e.g., assets, executables, code, or the like) and commences execution of that game locally.

Example Intermediate Rendering Language and Operations

Referring now to FIGS. 3A and 3B, in some embodiments, the rendering pipeline 302 uses an intermediate rendering language that includes various types of rendering operations 330 that may be transmitted across the rendering pipe 332. For example, rendering operations 330 may include a "Sprite2D" command, which represents a command to render a 2D sprite (e.g., a static symbol, an image sequence, a video texture). The rendering operations 330 may include a "Text2D" command, which represents a command to render a 2D text string (e.g., from a bitmapped texture). The rendering operations 330 may include an "UpdateMask" command, which represents a command to animate a mask material. Some masks are static and may not change from original load parameters. The rendering operations 330 may include a "PushMask" command, which represents a command to apply a bank of masks to renderable items to follow. The rendering operations 330 may include a "PopMask" command, which represents a command to remove a bank of masks from the renderable items to follow. The rendering operations 330 may include a "SetCamera" command, which represents a command to set camera perspective for the renderable items to follow (e.g., sent when camera has been changed).

In the example embodiment, rendering operations 330 are generated and transmitted through the rendering pipe 332 in an operations pipe format:

|# of ops=*n*|1:op data|2:op data| . . . |*n*:op data| where n is the number of operations to follow in a given rendering operations message, and where the rendering operations message includes n subsequent operations elements. Each operations element 1 to n includes an operation, "op", and data for that operation, "data". Further, the pipeline 302 may include a vertices pipe (not separately shown) that may include vertices data for each of the 1 to n operations in a vertices pipe format:

|1:vertices data|2:vertices data| . . . |*n*:vertices data|

Example rendering operations 330 and their associated vertices data include:

operation: RenderCommand.Sprite2D
  Format in the ops pipe (all entries stored as 32-unsigned int)
    id: RenderCommand.Sprite2D
    hash: Texture/VideoTexture/ImageSequence hash
    vpos: Position in the *vertices* pipe associated with this command
    elementId: instance-unique id
    dirtied: boolean indicating if data is dirtied
    maskMode:mode of mask to apply to this node
    if (maskMode !=Ignore)
      mask.RootId: root id of owner of mask
      mask.Bank: bank of mask
      mask.bit: bit fields of masks
      animated: boolean flag indicating if this is animatable sprite (e.g., video or imageSequence)
  Format in the vertices pipe (all entries stored as 32-Float)
    my: modelView (16 floats for 4×4 matrix)
    width: width of sprite
    height: height of sprite
    opacity: alpha channel
  if (dirtied)
    quad-left: quad's left normalized coordinate
    quad-top: quad's top normalized coordinate
    quad-right: quad's right normalized coordinate
    quad-bottom: quad's bottom normalized coordinate
  if (animated)
    frame: frame to update before rendering.
  if (transformations)
    count: the number of transformations
    length: the number of bytes of transformations
    transforms: the discrete transformations to allow native side to apply.
operation: RenderCommand.Text2D
  Format in the ops pipe (all entries stored as 32-unsigned int)
    id: RenderCommand.Render2DText
    vpos: Position in the *vertices* pipe associated with this command'
    nChars: The number of chars in the string, excluding the null character
    elementId: instance-unique id
    dirtied: boolean indicating if data his dirited
    opacity: alpha for channel for the text
    HashTexture[ ]: an array of hash values for each character the string to be rendered.
    maskMode: mode of mask to apply to this node (see MaskMode enums)
    if (maskMode !=Ignore)
      mask.RootId: root id of owner of mask
      mask.Bank: bank of mask
      mask.bit bit fields of masks
  Format in the vertices pipe (all entries stored as 32-Float)
    my: modelView (16 floats for 4×4 matrix)
    position[ ]: an array of 2*n chars*6 representing the quad (2*3 vertices of triangles*2 coordinate*nChars) of the position on the screen that string will be rendered
    texcoord[ ]: an array of 2*nChars*6 representing uv coords in the texture for texture mapping.
    if (transformations)
      count: the number of transformations
      length: the number of bytes of transformations
      transforms: the discrete transformations to allow native side to apply.
      width: the width of text in game pixels.
      height: the height of text in game pixels.
      scaleX: unity scale on the x-coordinate
      scaleY: unity scale on the y-coordinate.
operation: RenderCommand.UpdateMask
  Format in the ops pipe (all entries stored as 32-unsigned int)
    id: RenderCommand.UpdateMask
    rootId: hash Id for the owner of this mask. This is usually the Id of the root timeline.
    hash: hash of Mask Material
    vpos: Position in the *vertices* pipe associated with this command'
  Format in the vertices pipe (all entries stored as 32-Float)
    my: modelView (16 floats for 4×4 matrix)
    vertices[ ]: an array of 3*6 representing the vertices of the mask. Vertices are x,y,z coords which are defined by 2 triangle, hence 6.
operation: RenderCommand.PushMask
  Format in the ops pipe (all entries stored as 32-unsigned int)
    id: RenderCommand.PushMask
    rootId: hash Id for the owner of this mask. This is usually the Id of the root timeline.
  Format in the vertices pipe (all entries stored as 32-Float)
    <not used>
operation: RenderCommand.PopMask
  Format in the ops pipe (all entries stored as 32-unsigned int)
    id: RenderCommand.PopMask
    rootId: hash Id for the owner of this mask. This is usually the Id of the root timeline.
  Format in the vertices pipe (all entries stored as 32-Float)
    <not used>
operation: RenderCommand.SetCamera
  Format in the ops pipe (all entries stored as 32-unsigned int)
    id: RenderCommand.SetCamera
    vpos: Position in the *vertices* pipe associated with this command'

Format in the vertices pipe (all entries stored as 32-Float)

left: left coordinate of the viewport top: top coordinate of the viewport right: right coordinate of the viewport bottom: bottom coordinate of the viewport

ADDITIONAL ENHANCEMENTS

In some embodiments, the rendering pipeline 302 provides incremental frame updates. To reduce the data sent across a pipe, the protocol may support an incremental frame update. In this mode, the JS code will cache the render graph on each frame. The data that will be sent across the pipe 332 will be an incremental change to the render graph from the previous frames. Consider the following:

Frame 0:

render graph—[node A: position (−10, 0)]→[node B: opacity (1.0)]→[node C: position (120, 120)]→ . . . →[node Z: position (800, 800)]

pipe data: [[node A, position(−10, 0)], [node A, opacity (1.0)], [node c, position(120, 120)], . . . [node z, position(800, 800)]]

Frame 1:

render graph—[node A: position (−10, 0)]→[node AA: position (120, 120)]→[node B: opacity (1.0)]→ . . . →[node Z: position (800, 800)]

pipe data: [[node AA, added between (Node A and B) position(120, 120)], [node c, remove]]

The data traffic is reduced by sending the differences between the render graphs on adjacent frames.

In some embodiments, the rendering pipeline 302 implements variable frame rate rendering. Variable rate rendering allows the processes on either side of the pipe to run at different frame rates. The purpose of this mode is to promote better performance on low-end devices. The JS side of the game would be slowed down, using up less CPU on the device. The native side of the pipe would run at a desirable refresh rate. As nodes in the render tree animate, the native side would be responsible for interpolating changes to account for the game running at a slower frame rate. The frame rates would be established at system startup time.

The cost of this mode would be the loss of non-linear animations that occurred at a rate faster than the rate differential of the two processes. The animations would be emulated with a more linear path. The benefit is that the game would run smoother on a lower-end system. The option would be regulated by a customer facing application.

Consider a situation where the frame rate of the JS process is running at 15 fps, while the refresh rate of the native side is 30 fps:

Frame n (JS side)

render graph—[node A: position (−10, 100)]→ . . . ]

Frame n+1 (JS side)

render graph—[node A: position (−10, 200)]→ . . . ] as compared to:

Frame m (native side)

render graph—[node A: position (−10, 100)]→ . . . ]

Frame m+1 (native side)

render graph—[node A: position (−10, 150)]→ . . . ]

Frame m+2 (native side)

render graph—[node A: position (−10, 200)]→ . . . ]

In some embodiments, one or more of the client component 310 and the native component 340 may provide a recording component and/or a playback component (not separately shown) that facilitates recording and playback functionality for gameplay of gaming sessions. For example, in an example embodiment, the native component 340 records and stores the rendering operations 330 received from the rendering pipe 332 as an ordered "render stream." This recorded render stream may be played back by the client component 310 sending the render stream back to the native component 340 in order for processing, or the native component 340 may replay the render stream by processing the stored rendering operations 330 in order. Further, since this render stream is text based, the render stream may be compressed with a high degree using known compression techniques, allowing low bandwidth, lossless quality recording of game play with minimal processing overhead. Such recording, for example, may provide customer support with an exact playback of what the user experienced in any customer dispute situation.

Methods for Providing the Rendering Pipeline

Figure 4:
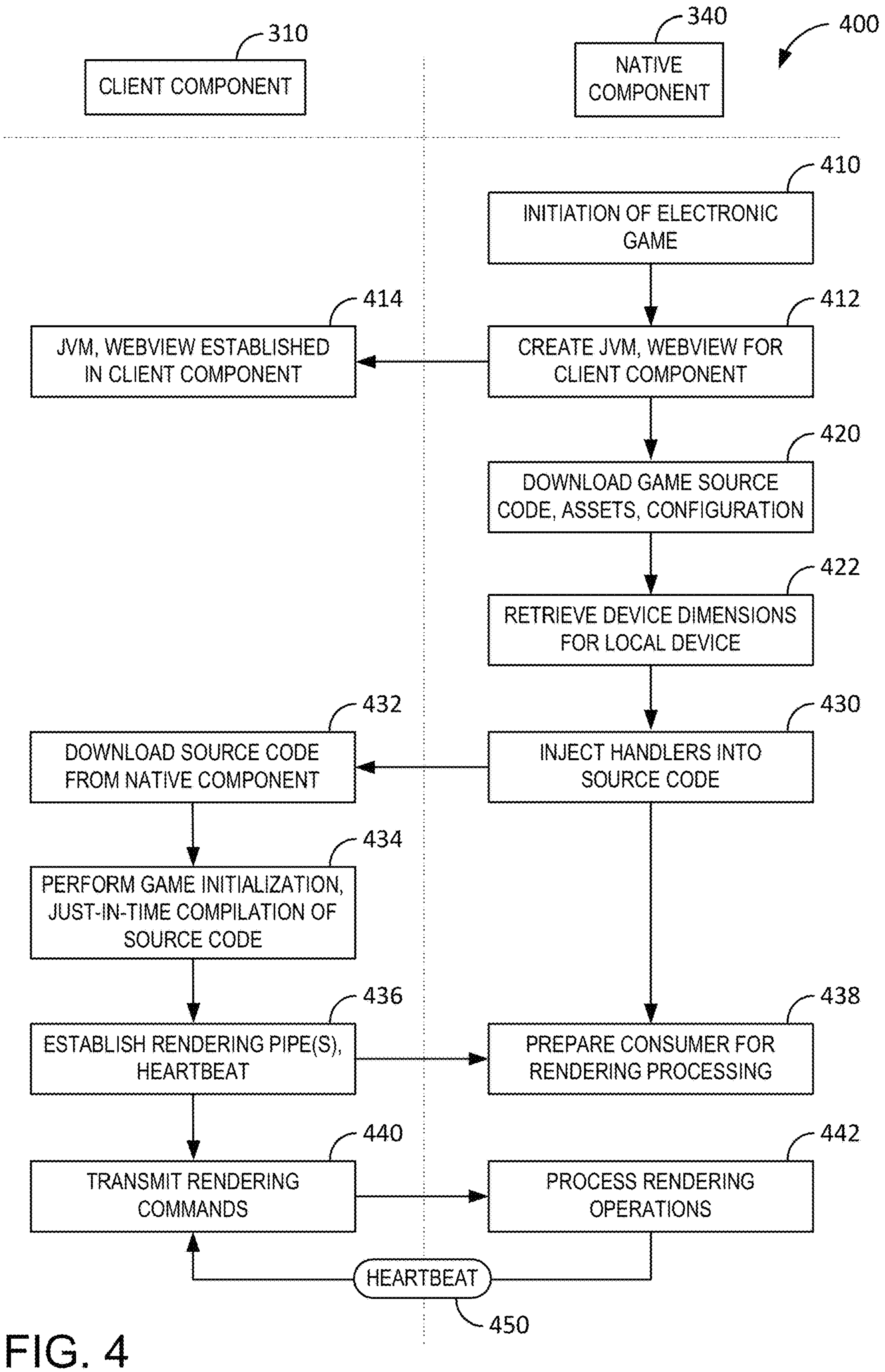
FIG. 4 is a swimlane diagram of an example method 400 for providing a rendering pipeline for an electronic game, such as the rendering pipeline 302 shown in FIG. 3A.

FIG. 4 is a swimlane diagram of an example method 400 for providing a rendering pipeline for an electronic game, such as the rendering pipeline 302 shown in FIG. 3A. In some embodiments, the method 400 may be performed by any of the various gaming devices 300 shown in FIGS. 3A and 3B. In the example embodiment, the method 400 includes initiating the electronic game at operation 410. At operation 412, the native component 340 creates a JVM with a WebView in the client component 310, culminating in the creation of the client component 310 at operation 414. At operation 420, the native component 340 downloads game source code, assets, and configuration settings (e.g., from games database 374, from local memory, or the like). At operation 422, the native component accesses device dimensions for the local device (e.g., screen size, max refresh rate, or the like, for the gaming device 300).

In the example embodiment, at operation 430, the native component 340 injects handlers into the game source code. The handlers add code for the render language producer 320, which allows the game to establish the rendering pipe 332, construct rendering operations 330, and the other various client-side operations described herein. In one example embodiment, a single JS-DOM element is injected into the JavaScript, varying slightly based upon the operating system and environment present on the gaming device 300 (e.g., iOS with WebKit, Android with Chromium, or the like). For example:

```
window.Unity = {
  call: function(msg) {
    window.webkit.messageHandlers.unityControl.postMessage(msg);
  }
}
```

This allows the JavaScript engine to determine whether the RL consumer 342 is listening and switch all presentation calls to instead be serialized through the window.Unity.call (string) DOM function.

At operation 432, the client component 310 downloads the "enhanced" source code from the native component 340 and, at operation 434, performs game initialization, including a just-in-time compilation and execution of the game source code. At operation 436, the client component 310 establishes the rendering pipe 332 and heartbeat 336 with the native component 340 (e.g., via execution of the handlers injected into the source code at operation 430). At operation 438, the native component 340 connects with the client component 310 and prepares the render language consumer 342 for rendering processing. At operation 440, execution of the electronic game begins generating graphics operations (e.g., source output operations), which causes the render language producer 320 to translate those source output operations into rendering operations 330 in the intermediate rendering language described herein and transmit those rendering operations 330 to the native component 340 via the rendering pipe 332. At operation 442, the rendering operations 330 are received by the native component 340 (e.g., by the render language consumer 342), which converts the intermediate render language operations into local hardware operations (e.g., audio, video), causing display of the game assets as indicated by the rendering operations 330. In the example embodiment, the rendering pipeline 332 is an asynchronous data flow from the client component 310 to the native component 340 in which the messages need not be acknowledged or necessarily processed before the next commands are sent. In some embodiments, the native component 340 sends a heartbeat 336 at operation 450 on a periodic frequency and the client component 310 may transmit rendering commands 330 based on the heartbeat 336.

VARIOUS TECHNICAL ADVANTAGES

The various embodiments of the rendering pipeline 302 for gaming devices 300 described herein provide any or all of the following technical advantages over the prior art: (A) performance on mobiles may be increased due to always using an engine with the capacity to JIT the javascript code; (B) objects are created in world space which is native to that of the main application (e.g., the Heart of Vegas application which is a native Unity3d application will have more flexibility on where the content is rendered on screen, having a new ability to richly define the layering (lobby objects can live behind, in front of, at the same level as all or some of the game elements), which may not be possible when the game is rendered to an opaque GL surface as in previous implementations; (C) the actual rendering API is not tied to the intermediate rendering language, allowing the rendering pipeline 302 to switch to using a newer native rendering API when older ones get deprecated (e.g., Apple may decide to remove OpenGLES 2 support in an upcoming iOS revision), where previous implementations would rewrite the game to support a transition to another backend API, where this implementation provides native support for whatever the client application supports; (D) the game lobby has richer control over the textures used by the game, allowing the lobby to, for example, replace assets baked into the slot game with newer ones for a Christmas event, where, previously, modification of game assets post export was difficult; (E) QA have a new avenue in which they can run automated tests, where, for example, these automated tests can be written in C # and live inside the Unity application, and they can work via walking over the Unity3d scene graph to determine states of components, and where there is no requirement to instrument or modify the underlying slot game to make this possible; (F) the rendering application is abstracted away from the game render server, where, for example, it would be trivial to move to a new engine (Unreal, for example)—this would not require changes to the game or the bespoke rendering language; (G) reduce power (e.g., battery) consumption on gaming devices (e.g., mobile devices) through streamlined processing and reduced complexity.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device providing a rendering pipeline for an electronic game, the electronic gaming device comprising:

at least one memory device storing a native component of the rendering pipeline;

at least one display device upon which video output of the electronic game is rendered; and at least one processor configured to execute the native component, wherein the native component, when executed on the at least one processor, is configured to:

receive rendering operations in an intermediate language via the rendering pipeline from a client component, wherein the rendering operations are converted from display commands in a source language by the client component;

translate the rendering operations from the intermediate language into rendering operations of the native component; and perform the rendering operations of the native component on the at least one display device.

2. The electronic gaming device of claim 1, wherein the at least one processor is further configured to execute the client component that converts display commands in the source language to rendering options in the intermediate language.

3. The electronic gaming device of claim 1, wherein the client component includes a virtual machine that is configured to perform just-in-time compilation and execution of the electronic game.

4. The electronic gaming device of claim 1, wherein the source language of the electronic game is one of JavaScript and Typescript, wherein the client component includes a java virtual machine that executes the electronic game.

5. The electronic gaming device of claim 4, wherein the client component is configured to create a WebView object and execute source code of the electronic game via offscreen WebKit rendering in the WebView object.

6. The electronic gaming device of claim 1, wherein the client component is configured to transmit asset loading operations to the native component, wherein the native component is configured to load assets identified by the asset loading operations.

7. The electronic gaming device of claim 1, wherein at least some of the rendering operations of the intermediate language include an operation type, a node identifier, and model data.

8. The electronic gaming device of claim 1, wherein a heartbeat is established between the native component and the client component, wherein the client component uses the heartbeat as timing for when to transmit the rendering operations to the native component through the rendering pipeline.

9. A method for providing a rendering pipeline for an electronic game on an electronic gaming device, the electronic gaming device including a memory device storing the electronic game and a native component of the rendering pipeline, the electronic gaming device also including a display device upon which video output of the electronic game is rendered and at least one processor configured to execute the native component, the method comprising:

receiving rendering operations in an intermediate language via the rendering pipeline from a client component, wherein the rendering operations are converted from display commands in a source language by the client component;

translating the rendering operations from the intermediate language into rendering operations of the native component; and performing the rendering operations of the native component on the display device.

10. The method of claim 9, wherein the client component includes a virtual machine that is configured to perform just-in-time compilation and execution of the electronic game.

11. The method of claim 9, wherein the source language of the electronic game is one of JavaScript and Typescript, wherein the client component includes a java virtual machine that executes the electronic game.

12. The method of claim 11, wherein the client component is configured to create a WebView object and execute source code of the electronic game via offscreen WebKit rendering in the WebView object.

13. The method of claim 9, wherein the client component is configured to transmit asset loading operations to the native component, wherein the native component is configured to load assets identified by the asset loading operations.

14. The method of claim 9, wherein at least some of the rendering operations of the intermediate language include an operation type, a node identifier, and model data.

15. The method of claim 9, wherein a heartbeat is established between the native component and the client component, wherein the client component uses the heartbeat as timing for when to transmit the rendering operations to the native component through the rendering pipeline.

16. A non-transitory computer-readable medium storing instructions that, when executed by a processor of an electronic gaming device, cause the processor to:

receive, at a native component, rendering operations in an intermediate language via a rendering pipeline from a client component, wherein the rendering operations are converted from display commands in a source language by the client component;

translate the rendering operations from the intermediate language into rendering operations of the native component; and perform the rendering operations of the native component on a display device.

17. The non-transitory computer-readable medium of claim 16, wherein the client component includes a virtual machine that is configured to perform just-in-time compilation and execution of an electronic game.

18. The non-transitory computer-readable medium of claim 16, wherein the client component is configured to transmit asset loading operations to the native component, wherein the native component is configured to load assets identified by the asset loading operations.

19. The non-transitory computer-readable medium of claim 16, wherein at least some of the rendering operations of the intermediate language include an operation type, a node identifier, and model data.

20. The non-transitory computer-readable medium of claim 16, wherein a heartbeat is established between the native component and the client component, wherein the client component uses the heartbeat as timing for when to transmit the rendering operations to the native component through the rendering pipeline.

* * * * *